United States Patent Office 2,879,705
Patented Mar. 31, 1959

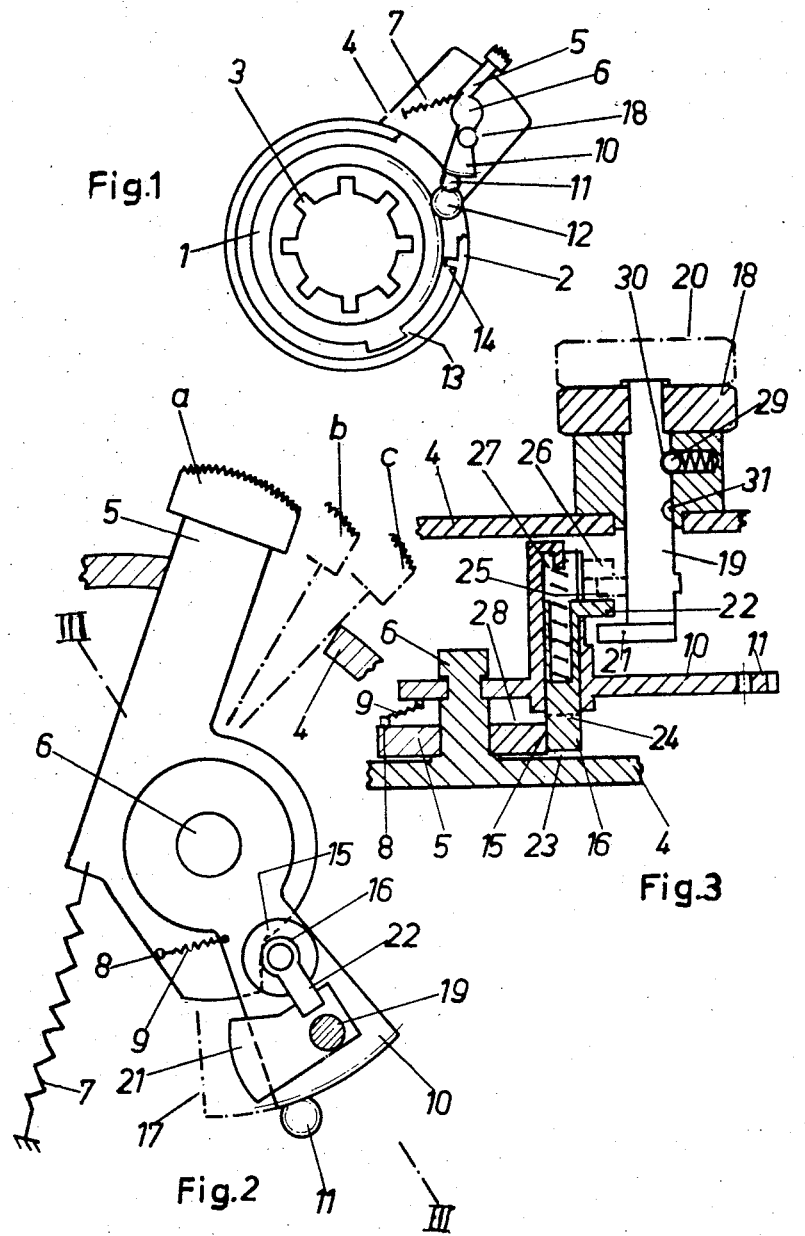

2,879,705

PHOTOGRAPHIC OBJECTIVE

Wilhelm Kukuk, Munich, Germany, assignor to Optische Werke C. A. Steinheil Sohne G.m.b.H., Munich, West Germany, a limited liability company Application November 14, 1956, Serial No. 622,151

Claims priority, application Germany November 15, 1955

2 Claims. (Cl. 95—64)

This invention relates to a photographic objective and relates more particularly to a photographic objective of the type provided with a diaphragm selection ring.

An object of the present invention is the provision of simple and effectively operating means for switching from an automatic selection of the diaphragm to a non-automatic selection and vice versa.

Other objects of the present invention will become apparent in the course of the following specification.

In accordance with the present invention the objective is provided with a switching pin which is located in a guide enabling it to move along a straight line parallel to the axis of the objective. This pin is prevented from rotation by the guide which constitutes a part of the casing. The pin has preferably the form of a button which can be pressed inwardly to a locking position and pulled out to an inoperative position. In the locking position the shutter release lever is coupled with a device for the automatic shifting of the diaphragm while in the inoperative position this connection is interrupted.

In accordance with another feature of the present invention a second pin is used which extends parallel to the first-mentioned pin. When the first pin is pulled out the second pin is pulled along with it against the action of a spring and moves to a position which provides for the manual non-automatic shifting of the diaphragm. This second pin is mounted in a toothed segment which, by means of gears, is connected with the diaphragm selection ring. The toothed segment is rotatably mounted upon the same axle which carries the shutter release lever and is connected with this lever by means of a spring.

The first-mentioned switching pin can be provided with a flange or the like, which extends sidewise and forms essentially a flat annular member. When the first-mentioned switching pin is pulled outwardly its flange will engage a projection or the like provided upon the second pin and thus the second pin will be raised against the action of the spring out of its end position for the automatic shifting of the diaphragm, so that the pin will not be engaged any more by an edge of the shutter release lever. The switching pin can be maintained in its two end positions by means of locking devices.

The invention will appear more clearly from the following detailed description when taken in connection with the accompanying drawing showing, by way of example, a preferred embodiment of the inventive idea.

In the drawing:

Figure 1 is a diagrammatic top view of an objective provided with the device of the present invention.

Figure 2 is a section perpendicular to the axis of the objective and shows the switching mechanism on a larger scale.

Figure 3 is a section along the line III—III of Figure 2.

The drawing shows an objective 1 having a diaphragm selection ring 2 which cooperates in the usual manner with an iris ring 3. The casing of the objective is provided with an extension 4 which carries the switching device.

The device comprises a shutter release lever 5 which is mounted upon an axle 6, and which is connected to a spring 7. A toothed segment 10 is also mounted upon the axle 6 and is connected to a spring 9 which is attached at 8 to the shutter release lever 5. The segment 10 meshes with a gear wheel 11 which meshes with a gear 12. The gear wheel 12 engages the iris ring 3. The setting of the diaphragm is accomplished in the usual manner when the projection 13 strikes the projection 14 of the diaphragm selection ring 2 (Fig. 1).

The shutter release lever 5 has an edge 15 which is adapted to strike a pin 16 mounted in the toothed segment 10.

The device for automatically setting the diaphragm operates as follows:

When the user swings the shutter release lever 5 from the position $a$ (Fig. 2) about the axle 6, the lever will first assume the position $b$ while tensioning the spring 7. The spring 9 will cause the toothed segment 10 to move along with the lever 5; the toothed segment 10 will move clockwise. Since the segment 10 meshes with the gear 11 its rotation will be transmitted through the gears 11 and 12 to the iris ring 3 and the diaphragm will be set in the desired manner by the engagement of the projections 13 and 14. If the user now continues to turn the lever 5 in the same direction until it assumes the position $c$, the toothed segment 10 will be prevented by the projection or stop 14 from rotating any further, so that merely the spring 9 will be subjected to additional tension. During the movement from the position $b$ to the position $c$, the lever 5 will actuate the usual camera release mechanism which is not shown in the drawings.

When the user has completed the photographing he will release the lever 5 and then the spring 7 will pull it from its end position $c$ to the position $b$ and the tension of the spring 9 will be diminished. The edge 15 of the lever 5 which was moved away from the pin 16 during the movement of the lever 5 from the position $b$ to the position $c$ and back from the position $c$ to the position $b$, will strike the pin 16 during the return movement. During the further return movement from the position $b$ to the position $a$, the edge 15 of the lever 5 will press the pin 16 back in its initial position shown in Figure 2. Since the pin 16 is mounted in the toothed segment 10, the segment will move from the position 17 which corresponds to the position $b$ of the lever 5, into the initial position shown in full lines in Figure 2. During this return movement of the segment 10, the gears 11 and 12, and consequently the iris ring 3, will also be rotated and the diaphragm will be set back to its complete opening.

The switching from the automatic operation of the diaphragm to a non-automatic operation, is carried out by means of a button 18, which is shown in Figure 3. The button 18 is connected with a switching pin 19 which is guided for a straight up and down movement by any suitable means, not shown in the drawings, and which is prevented from rotation. The switching pin 19 is provided with a flange 21 which extends sidewise under the projection 22 of the pin 16.

The operation of this device is as follows:

In order to enable the user to set the diaphragm at will by hand and to prevent the diaphragm from being completely opened when the lever 5 is released, the user merely pulls the button 18 from the position shown in full lines in Figure 3 to the position 20. The switching pin 19 moves along with the button 18 and its flange 21 will engage the projection 22 of the pin 16. It should be noted that the flange 21 has essentially the form of a flat ring and is so arranged that it is affected by the movement of the lever 5 within the angle represented by the positions a and b.

Thus when the button 18 is pulled out and the switching pin 19 moves with it, the pin 16 will be moved from the position indicated by the full line 23 to the position indicated by the broken line 24 in Figure 3. Consequently, the pin 16 will be raised above the edge 15 of the lever 5 and will not be engaged by the edge 15 any more. At that time the flange 21 of the switching pin 19 and the projection 22 of the pin 16 will be moved to the positions shown by broken lines in Figure 3 and indicated by the numerals 25 and 26. During its upward movement the pin 16 presses on spring 27 which is located within the pin, and which has the tendency to push the pin 16 back to its original lowermost position. Furthermore, the upward movement of the pin 16 takes place against the friction produced at the edge 15 by the spring 9.

It is apparent that so long as the pin 16 is in its upper position 24, the toothed segment 10 can be freely swung about the axle 6. Thus the user will be able to turn freely the iris ring 3 in both directions and can increase or diminish the diaphragm opening at will. If the user wants to increase the diaphragm opening while the button 18 is in the position 20, he must rotate the diaphragm selection ring 2 clockwise and the stop 14 will move along with the stop or projection 13. If the user wants to diminish the diaphragm opening, the selection ring 2 must be rotated counter-clockwise, whereby the stop 13 will continue to press against the stop 14 through the spring 9, so that the iris ring 3 will be also rotated.

When the user pushes the button 18 from its position 20 to the position shown in full lines in Figure 3, the spring 27 will press the pin 16 downwardly until the lower end of the pin 16 will engage the upper surface 28 of the shutter release lever 5. By sufficiently swinging the lever 5 from the position a toward the position c the edge 15 will clear the pin 16, so that the pin 16 can be pressed by the spring 27 back to its end position, shown in Figure 3, in which it can be engaged again by the edge 15.

It is advisable to provide locking means for holding the switching pin 19 in its two end positions. In the construction shown in Figure 3, the pin 19 is provided for that purpose with recesses 30 and 31. A spring actuated ball 29 presses against the side surface of the pin 19 and will snap into anyone of these recesses.

It is apparent that the example described above has been shown solely by way of illustration and not by way of limitation, and that it is subject to many variations and modifications within the scope of the present invention. All such variations and modifications are to be included within the scope of the present invention.

What is claimed is:

1. In a photographic objective having a shutter release lever and a diaphragm selection ring; an axle, said shutter release lever being rotatably mounted upon said axle, a toothed segment rotatably mounted upon said axle, gears meshing with said toothed segment and operatively connected with said diaphragm selection ring, a spring connecting said toothed segment with said shutter release lever, a pin mounted in said toothed segment and movable from a lower position to an upper position, said pin engaging said shutter release lever in said lower position and being devoid of engagement with said shutter release lever in said upper position, a switching pin, and means supporting said switching pin for movement in a direction parallel to the direction of the objective axis from a locking position to an inoperative position and vice versa, said switching pin when moving from said locking position to said inoperative position engaging the first-mentioned pin and moving it from said lower position to said upper position.

2. In a photographic objective having a shutter release lever and a diaphragm selection ring; an axle, said shutter release lever being rotatably mounted upon said axle, a toothed segment rotatably mounted upon said axle, gears meshing with said toothed segment and operatively connected with said diaphragm selection ring, a spring connecting said toothed segment with said shutter release lever, a pin mounted in said toothed segment and having a projection, said pin being movable from a lower position to an upper position, said pin engaging said shutter release lever in said lower position and being devoid of engagement with said shutter release lever in said upper position, a switching pin having a flange, and means supporting said switching pin for movement in a direction parallel to the direction of the objective axis from a locking position to an inoperative position and vice versa, the flange of said switching pin engaging the projection of the first-mentioned pin when said switching pin is moved from said locking position to said inoperative position and moving the first-mentioned pin from said lower position to said upper position.

References Cited in the file of this patent
UNITED STATES PATENTS

| 2,343,206 | Rath | Feb. 29, 1944 |

FOREIGN PATENTS

| 891,187 | Germany | Sept. 24, 1953 |
| 1,116,327 | France | Jan. 30, 1956 |